Aug. 27, 1935. G. E. SHOEMAKER 2,012,894
COMBINATION FLASH LIGHT FISHING ROD AND FROG GIG
Filed Aug. 30, 1934 2 Sheets-Sheet 1
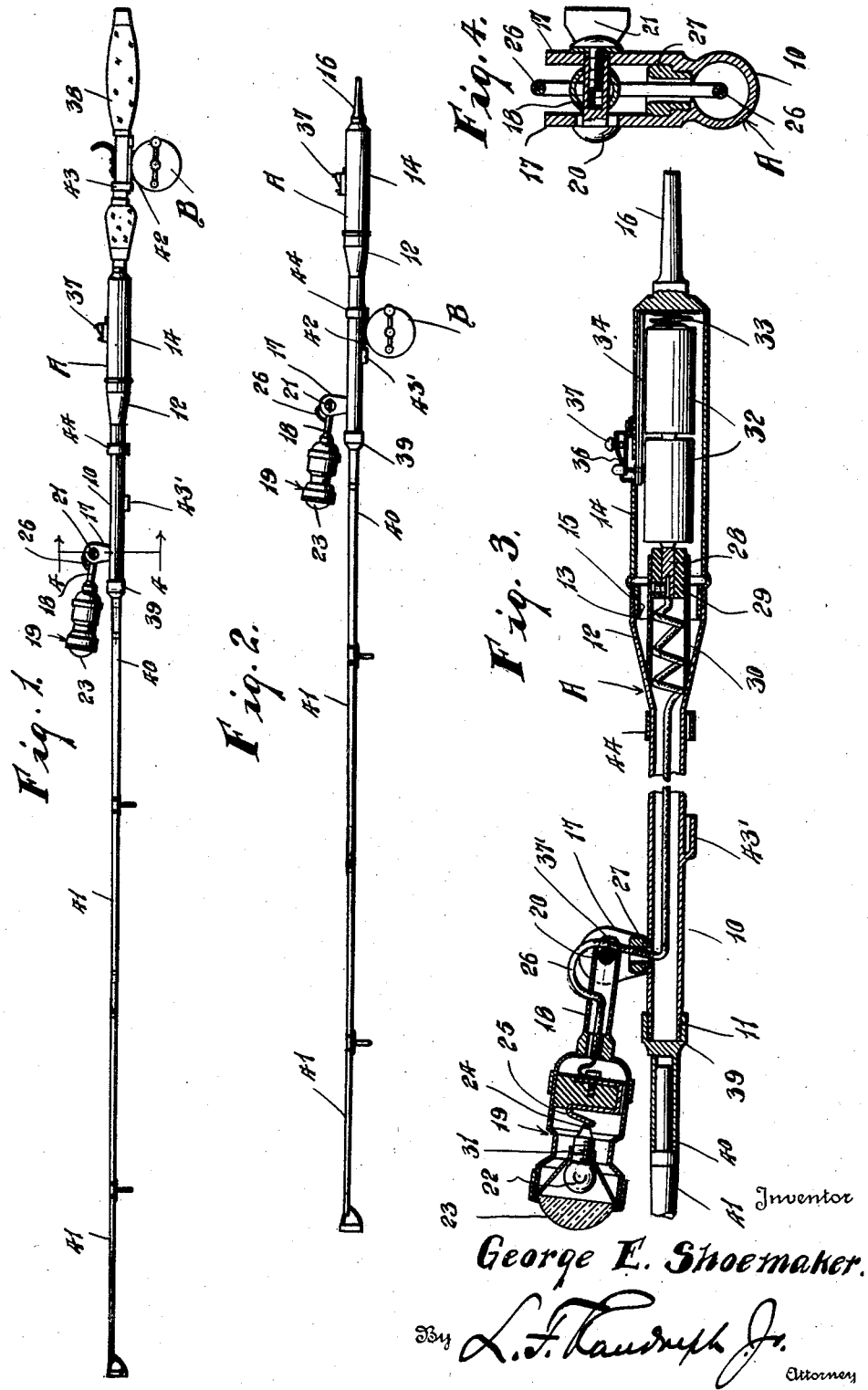

Aug. 27, 1935.  G. E. SHOEMAKER  2,012,894
COMBINATION FLASH LIGHT FISHING ROD AND FROG GIG
Filed Aug. 30, 1934  2 Sheets-Sheet 2
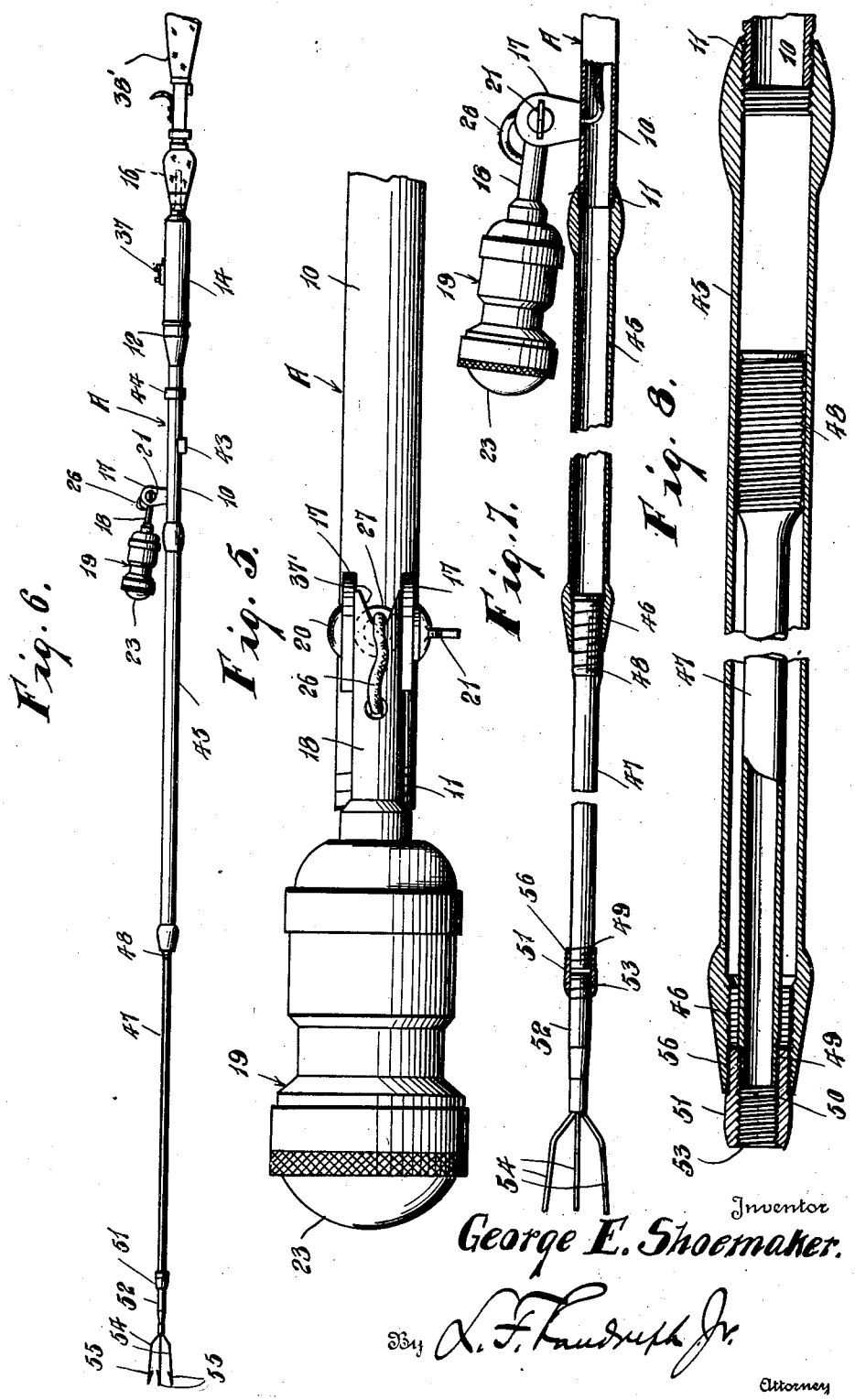
Inventor
George E. Shoemaker.
Attorney Patented Aug. 27, 1935

2,012,894

UNITED STATES PATENT OFFICE 2,012,894

COMBINATION FLASH LIGHT FISHING ROD, AND FROG GIG

George E. Shoemaker, Nowata, Okla., assignor of one-third to Taylor R. Armstrong, Nowata, Okla., and one-third to James Pearl Shoemaker, Texarkana, Tex.

Application August 30, 1934, Serial No. 742,163

3 Claims. (Cl. 240—6.4)

This invention relates to a combination device capable of use as an illuminated fishing rod and also as a frog gig.

It is particularly aimed to provide a novel attachment which may be readily connected in a sectional fishing rod or frog gig.

The invention aims generally to make night fishing and frog hunting more pleasant either from the bank or from a boat and the more specific objects and advantages will in part be pointed out hereinafter and otherwise become apparent from a consideration of the description following taken in connection with accompanying drawings illustrating an operative embodiment.

In said drawings:—

Figure 1 is a view in side elevation of a fishing rod embodying my improvement;

Figure 2 is a view similar to Figure 1 of the fishing rod embodying my improvement minus the rod butt or handle;

Figure 3 is an enlarged longitudinal sectional view through the parts to effect illumination;

Figure 4 is a cross sectional view taken on the line 4—4 of Figure 1;

Figure 5 is a plan view of that portion of the rod adjacent the lamp;

Figure 6 is a side elevation of the invention used as a frog gig;

Figure 7 is a view primarily in longitudinal section through the forward sections of the gig, and Figure 8 is a detail longitudinal sectional view through the forward sections of the gig-supporting rod in folded or telescoped relation.

Referring specifically to the drawings, wherein like reference characters designate like or similar parts, each form of the invention, that is, whether used as a fishing rod or as a frog gig, utilizes a section generally designated A having a tube 10 whose forward portion is reduced and provided with screw-threads 11 for attachment to adjacent pole sections, while its rear end is enlarged as at 12 and detachably telescoped over the forward end 13 of a casing 14, preferably being screw-threaded thereto as at 15, whose closed end is provided with a spur or shank 16 adapted for attachment of a handle or butt end thereto or to be thrust into the ground to support the rod or device in an upright position.

Reduced portion 10 has two laterally extending ears 17 to which, by means of a hollow shank or tube 18, an electric lamp 19 is pivoted through the aid of a bolt 20 having a winged operating element at 21. The lamp 19 may be of any desired construction. For example, it has a bulb 22 over which is a bull's eye or lens 23, a central contact 24 of the lamp being engaged by a contact 25 and connected with a flexible conductor 26, preferably insulated and extending through and outwardly of tube 18 and through an eyelet 27 in the tubular portion 10 and interiorly of such portion, being terminally coiled and fastened to a fixed contact 28, mounted in insulation 29, carried by a tube 20 fixed within the tubular portion 12. The other terminal of the lamp as at 31 is grounded to the casing of the lamp 19 and to the tube 10, its portion 12, and the casing 14. The casing 14 is of any desired size and adapted to contain any desired number of batteries, such as dry batteries 32. A spring 33 aids in positioning the batteries and conducts current therefrom to a contact 34, insulated from the casing 14. Coacting with the contact 34 is a contact 36, normally spaced therefrom and connected to the casing 14. Thus the circuit through the lamp is normally broken. However, through the medium of a sliding element 37, the contacts 34 and 36 are engaged to close the circuit. Through the adjustment of the element 21, any desired degree of friction may be provided between the bolt 20 and the ears, to enable adjustment of the lamp 19 to any angle and hold it at the desired angle or position. As will be seen in Figure 5, the free end of the tube or shank 18 is grooved or notched as at 37 to better guide the conductor 26.

It will be seen particularly in Figures 1 and 2, that the specifically described section A may be used in a conventional fishing pole, the butt end or handle section 38 being detachably connected to the shank 16, and the screw-threads at 11 being detachably connected to a socket 39 of the adjacent pole section 40. A number of pole sections 41, of conventional form, are detachably connected to the section 40.

In Figure 2, it will be noted that the butt section 38 is omitted. This leaves the shank 16 exposed and enables the pole to be thrust into the ground if desired.

The reel associated with the pole, generally designated B, is shown in Figure 1 as provided with an attaching plate 42 held to the butt section by slidable clamp rings 43. When the pole is adapted to be supported vertically as in Figure 2, the aforesaid reel B has one end of its plate 42 entered in a socket 43 offset from the tubular section 10, and its other end engaged by a slidable clamping ring 44 on the tubular section 10.

As better appears from Figures 6, 7, and 8, my improvements may be incorporated in a frog gig. In this form of the invention, the aforesaid section A is used, one end having a butt section or handle connected to the spur 16 as at 38', which may be the identical handle used in the preceding form. To the screw-threads 11, a pole section 45 is screw-threaded, whose opposite end is interiorly threaded as at 46. Another tubular section of less diameter than the section 45 is shown at 47 having screw-threads at 48, adapted for engagement with those at 46. Said section 47 at its outer or smaller end has screw-threads at 49 engaging interior screw-threads 50 of a nipple 51. Such nipple at the screw-threads 51 is adapted for detachable connection by the shank 52 at screw-threads 53 thereof, which shank 52 carries a plurality of barbs 54, whose ends are sharpened and provided with lugs 55 similar to fish hooks. The device may thus be used for thrusting of the barbs 54 into a frog or the like, aided by the gigging effect afforded by lamp 19.

Particular attention is called to the fact that the sections 45 and 47 are adapted to be telescoped one within the other and fastened in that position as shown in Figure 8, since the threads 48 may be detached from those at 46 inwardly and since the nipple 51 has exterior screw-threads at 56 adapted to be engaged with the screw-threads 46.

The gigging effect of the lamp 19 in each form of the invention and the added pleasure which it will afford fishing and frogging will be apparent.

Various changes may be resorted to provided they fall within the spirit and scope of the invention.

I claim as my invention:—

1. In a catching pole of the class described a lamp intermediate its ends to illuminate the catching end of the pole, means carried by the pole to energize the lamp, said lamp and means being embodied in a unit forming one section of the pole, a spur on one end of the unit, a butt section attachable to the spur, and pole sections attachable to the other end of the unit.

2. A device of the class described having a tube attachable to a section of a fishing pole or the like and provided with an enlargement at one end, a lamp casing pivotally mounted on the tube, a lamp in said casing, a battery casing connected to the enlargement, battery means in the casing, a second tube secured in said enlargement and alined with the reduced portion of the first tube, a contact fixed in the second mentioned tube and electrically connected with said battery, a conductor leading from the lamp to the fixed contact, the casing of the lamp and first mentioned tube being grounded, the battery casing being connected to the first mentioned tube about the second mentioned tube, and a switch on the battery casing connected thereto and to the battery means electrically.

3. A device of the class described having a tube attachable to a section of a fishing pole or the like and provided with an enlargement at one end, a lamp casing pivotally mounted on the tube, a lamp in said casing, a battery casing connected to the enlargement, battery means in the casing, a second tube secured in said enlargement and extending into the casing, said second tube being aligned with the reduced portion of the first tube, a contact fixed in the second mentioned tube and electrically connected with said battery, a conductor leading from the lamp to the fixed contact, the casing of the lamp and first mentioned tube being grounded, a switch on the battery casing connected thereto and to the battery means electrically, and means pivotally mounting the lamp casing comprising a shank, said shank having a notch in one end thereof for the guidance of the conductor.

GEORGE E. SHOEMAKER.